No. 785,251. Patented March 21, 1905.

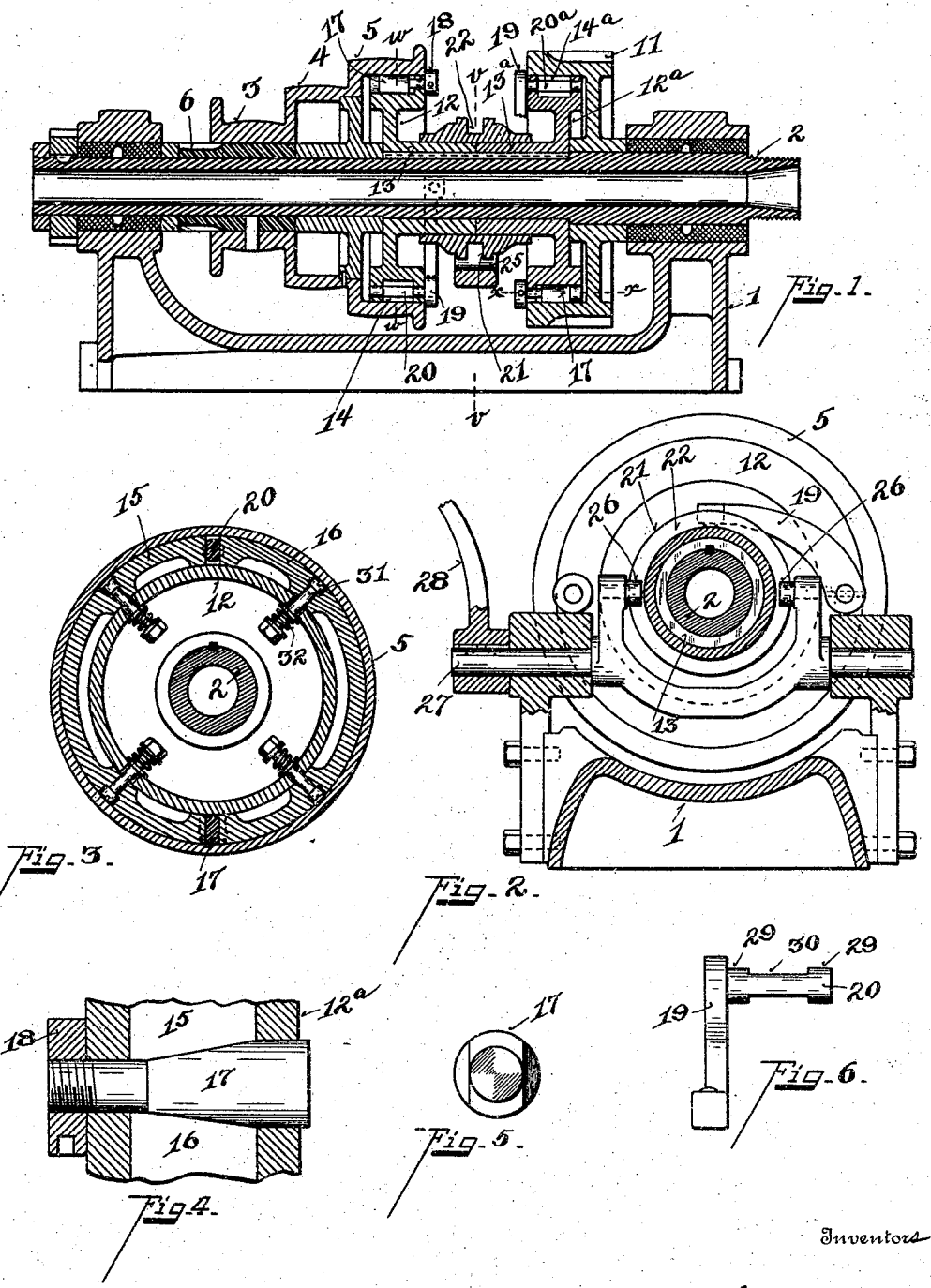

UNITED STATES PATENT OFFICE.

NICHOLAS D. CHARD AND WILLIAM LODGE, OF CINCINNATI, OHIO, ASSIGNORS TO THE LODGE & SHIPLEY MACHINE TOOL COMPANY, OF CINCINNATI, OHIO, A CORPORATION.

CLUTCH.

SPECIFICATION forming part of Letters Patent No. 785,251, dated March 21, 1905.

Application filed January 3, 1905. Serial No. 239,493.

*To all whom it may concern:*

Be it known that we, NICHOLAS D. CHARD and WILLIAM LODGE, citizens of the United States, residing at Cincinnati, in the county of Hamilton and State of Ohio, have invented certain new and useful Improvements in Clutches, of which the following is a specification.

Our invention relates to a frictional clutch adapted to be operated by a quick-shift device, and, as shown in the drawings, is applied to a head-stock of an engine-lathe for transmitting power to the lathe-spindle.

Of course the clutching mechanism may be applied to any of the machine-tools with similar efficient result.

One of the objects of our invention is to provide means for adjusting the ring-segments forming a part of the clutching mechanism to take up lost motion or wear and which adjusting means is so arranged as to provide ready and convenient adjustment without dismantling any of the parts.

Another object of our invention is to provide means whereby the ring-segments are automatically held free from peripheral contact with the driven member of the clutch when the ring-segments are not in clutching engagement.

The features of our invention are more fully set forth in the description of the accompanying drawings, forming a part of this specification, in which—

Figure 1 is a central vertical section through the lathe-spindle and clutch. Fig. 2 is an enlarged section on line $v$ $v$, Fig. 1. Fig. 3 is an enlarged section on line $w$ $w$, Fig. 1. Fig. 4 is an enlarged section on line $x$ $x$, Fig. 1. Fig. 5 is an end view of the adjusting-wedge shown in Fig. 3. Fig. 6 is an enlarged top plan view of the friction-ring tripping-lever.

1 represents a head-stock; 2, the spindle journaled therein.

3, 4, and 5 represent the cone of belt-pulleys loose on the spindle-sleeve 2.

6 represents a pinion fixed to the cone.

Within the open end of the cone-pulley 5 is a wheel 12, formed on a sleeve-hub 13, which sleeve-hub is fixed to the spindle. The periphery of the wheel is provided with an annular groove 14, concentric with the axis of the wheel. Within this groove are placed the expanding segments 15 and 16. Between two of the abutting ends of these segments is a taper plug 17, (see Fig. 4,) having one end projected through the periphery of the wheel 12 and provided with an adjusting-nut 18. By turning the nut 18 the taper plug may be drawn in either direction to separate or bring together the abutting ends of the segments 15 and 16.

19 represents an arm one end of which is fixed to an expanding-pin 20, the pin 20 having flat sides and being inserted between the other opposing ends of the segments 15 and 16.

Within the gear-wheel 11 is a similar wheel $12^a$, provided with a similar sleeve-hub $13^a$, fixed to the spindle. Wheel $12^a$ has also a peripheral groove $14^a$, within which are located the expanding segments 15 and 16.

$19^a$ represents an arm similar to arm 19, having a similar expanding-pin $20^a$.

Slidably located upon the abutting sleeves 13 $13^a$ is a sleeve 21, having the groove 22 and the cams upon opposite sides of the groove. The opposite ends of the arms 19 $19^a$ normally bear against the cylindrical portions of the periphery of the sleeve 21.

25 represents a shifting device shown as a yoke having the opposite pins 26 engaging into the groove 22 of the shifting sleeve 21.

27 represents the shaft for oscillating the yoke 25. One end of this shaft is projected through the head-stock and provided with an operating-handle 28. (See Fig. 2.)

Each of the pins 20 $20^a$ have round portions 29 upon opposite sides of the flat surface 30, (see Fig. 6,) the round portions journaling in the walls of the wheel 12 $12^a$. By this means the arm 19 is fulcrumed to the periphery of the wheel 12 and the arm $19^a$ is similarly fulcrumed to the periphery of the wheel $12^a$.

With the sleeve 21 in the position shown in Fig. 1, midway between the gear-wheel 11 and the cone-pulley 5, the spindle is idle. If now the sleeve be shifted toward the cone-pulley 5, the cam of the sleeve 21 engages the arm 19, raising the arm, and thereby turning the pin 20, expanding the segments, and clutching the cone-pulley to the wheel 12, and so to the spindle. It will be understood that the segments 15 and 16 lie between the wheel 12 and the internal periphery of the cone-pulley 5. To throw in the gear 11, the sleeve 21 is shifted toward the gear-wheel 11, which clutches the gear-wheel 11 to the wheel 12ª, freeing the cones 3, 4, and 5 from the spindle, and so driving the spindle through the gear-wheel 11.

31 represents bolts seated in the ring-segments 15 and 16 and projecting through the wheel 12.

32 represents springs bearing against the wheel 12 and the free ends of the bolts for the purpose of drawing the ring away from the driven member when not in its clutching position.

Having described our invention, we claim—

1. In combination with the spindle of a machine-tool, a loose wheel thereon for driving the spindle, an internal wheel fixed to the spindle, and concentric with the first-named wheel, said internal wheel being formed with an annular grooved periphery, two friction-segments located in said groove, an expanding device between two of the abutting ends of said segments, means for actuating the said device, and a wedge between the other two abutting ends of said segments for taking up wear and lost motion, substantially as described.

2. In combination with the spindle of a machine-tool, a loose wheel thereon for driving the spindle, an internal wheel fixed to the spindle, and concentric with the first-named wheel, said internal wheel being formed with an annular grooved periphery, two friction-segments located in said groove, an expanding device between two of the abutting ends of said segments, means for actuating the said device, a wedge between the other two abutting ends of said segments for taking up wear and lost motion, and bolts taking through said annular periphery and into said segments holding them slightly movable in position, substantially as described.

In testimony whereof we have hereunto set our hands.

NICHOLAS D. CHARD.
WILLIAM LODGE.

Witnesses:
OLIVER B. KAISER,
LUISE BECK.